(12) United States Patent
Wright et al.

(10) Patent No.: US 11,694,201 B2
(45) Date of Patent: Jul. 4, 2023

(54) ATM INTERCOMMUNICATION SYSTEM AND METHOD FOR FRAUDULENT AND FORCED TRANSACTIONS

(71) Applicant: JPMorgan Chase Bank, N.A., New York, NY (US)

(72) Inventors: Nathan James Wright, Lakewood, OH (US); Robert C. Schieber, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/890,435

(22) Filed: Jun. 2, 2020

(65) Prior Publication Data

US 2020/0387903 A1  Dec. 10, 2020

Related U.S. Application Data

(60) Provisional application No. 62/859,488, filed on Jun. 10, 2019.

(51) Int. Cl.
*G06Q 40/00* (2023.01)
*G06Q 20/40* (2012.01)
*G06Q 20/10* (2012.01)

(52) U.S. Cl.
CPC ..... *G06Q 20/4012* (2013.01); *G06Q 20/1085* (2013.01)

(58) Field of Classification Search
CPC ........... G06Q 20/4012; G06Q 20/1085; G06Q 20/10; G07F 19/20; G07F 19/207; G07F 7/1083; G07F 7/10
See application file for complete search history.

(56) References Cited

U.S. PATENT DOCUMENTS 5,825,283 A * 10/1998 Camhi ................. B60R 25/102
  701/1
2011/0057034 A1 * 3/2011 Maxwell .............. G06Q 20/346
  235/382

(Continued)

OTHER PUBLICATIONS

Krebs, Brian (Does Your Alarm Have a Default Duress Code?https://krebsonsecurity.com/2013/01/does-your-alarm-have-a-default-duress-code/ Jan. 2, 2013) (Year: 2013).*

*Primary Examiner* — Mike Anderson
*Assistant Examiner* — Mark H Gaw
(74) *Attorney, Agent, or Firm* — Greenblum & Bernstein, P.L.C.

(57) ABSTRACT

Various methods, apparatuses/systems, and media for implementing a multi-tier intercommunication module (MTIM) for an automatic teller machine (ATM) to prevent fraudulent and forced transactions are provided. A processor within the MTIM verifies whether an anomaly withdrawal transaction is occurring based on analysis of a user's normal banking behavior. When anomaly transactions are detected, the processor transmits a notification to the user's registered Multi-Factor Authentication (MFA) device to verify whether the transaction is fraudulent. Additionally, the MTIM provides a continuous feedback loop of user location data when forced transactions have been triggered. Forced card transactions are allowed completion and the MTIM sends a custom security code (CSC) to the user's registered MFA mobile device. An application module, running on this MFA device, upon receiving this CSC will automatically send continuous push notifications on pre-determined time deltas containing location data of the user to a security module operated by a local authority.

5 Claims, 8 Drawing Sheets

(56) References Cited

U.S. PATENT DOCUMENTS

| | | | |
|---|---|---|---|
| 2014/0070001 A1* | 3/2014 | Sanchez | G06Q 40/025 235/380 |
| 2014/0316841 A1* | 10/2014 | Kilby | G06F 16/51 705/7.26 |
| 2016/0110707 A1* | 4/2016 | Nack | G06Q 20/3278 705/38 |
| 2016/0267485 A1* | 9/2016 | Walz | G06Q 30/0229 |
| 2018/0060954 A1* | 3/2018 | Yin | G06F 21/31 |
| 2018/0121913 A1* | 5/2018 | Unnerstall | G06Q 20/3224 |
| 2018/0197181 A1* | 7/2018 | Kurian | G07F 7/1025 |
| 2020/0111099 A1* | 4/2020 | Benkreira | G06Q 20/4014 |

\* cited by examiner

ATM INTERCOMMUNICATION SYSTEM AND METHOD FOR FRAUDULENT AND FORCED TRANSACTIONS

CROSS-REFERENCE TO RELATED APPLICATIONS

This application claims the benefit of priority from U.S. Provisional Patent Application No. 62/859,488, filed Jun. 10, 2019, which is herein incorporated by reference in its entirety.

TECHNICAL FIELD

This disclosure generally relates to automatic teller machine (ATM), and, more particularly, to methods and apparatuses for implementing a multi-tier intercommunication module for leveraging multi-factor authentication in preventing fraud within ATM systems, reducing the number of fraudulent and forced ATM transactions, and ensuring ATM user's safety.

BACKGROUND

Traditionally, ATMs have been a target for a quick cash grab. This may often lead to an unintended consequence of leaving ATM customers vulnerable to both financial as well as physical wrong doing. Today, many banks may lack the ability to safeguard ATMs to protect their customer in a reliable manner. This is because, conventionally, multi-factor authentication (MFA) may have been utilized exclusively within online financial systems due to its added layer of security for accessing sensitive data. Recently, however there has been a shift towards using MFA for any authentication based system: ranging from online banking to social media sites, e.g., Facebook. This may be due to MFA requiring two or more of the following forms of authentication: something one knows (username, password, etc.), something one has (secure token, security code, etc.), or someone's biometric features (fingerprint, retina scan, etc.). Utilization of MFA may prevent unauthorized access to sensitive data, such as financial accounts and social media accounts, but fraudulent and forced transactions may still pose a major problem for banking consumers utilizing ATMs.

SUMMARY

The present disclosure, through one or more of its various aspects, embodiments, and/or specific features or sub-components, provides, among other features, various systems, servers, devices, methods, media, programs, and platforms for implementing a multi-tier intercommunication module for leveraging MFA within ATM systems, reducing the number of fraudulent and forced ATM transactions, and ensuring ATM user's safety. The various aspects, embodiments, features, and/or sub-components provide optimized processes of implementing a multi-tier intercommunication module by integrating multi-tier intercommunication system and ATMs with MFA technology to allow constant communication, through push notifications, between, for example, an ATM user's mobile phone, an ATM where a forced transaction (e.g., while the ATM user is forced by a robber to conduct an ATM transaction without ATM user's free will) may be occurring, and a security system operated by a local authority, thereby ensuring and enhancing safety of the ATM user. The various aspects, embodiments, features, and/or sub-components further provide optimized processes of implementing a multi-tier intercommunication module by integrating multi-tier intercommunication system and ATMs with MFA technology to allow detection and prevention of fraudulent ATM transactions by an unauthorized possessor of an ATM card or any equivalents thereof (e.g., a smartphone or equivalent technology that may be utilized to replace ATM cards).

According to an aspect of the present disclosure, a method for implementing a multi-tier intercommunication module by utilizing one or more processors and one or more memories is disclosed. The method may include: storing, on to a memory, a first personal identification number (PIN) and a second PIN different from the first PIN associated with a card transaction; receiving a user input onto an ATM; verifying whether the user input matches the first PIN or the second PIN; and authenticating the user, in response to verifying, to allow completion of the card transaction via the ATM. When it is verified that the user input matches the second PIN, the method may further include: transmitting a security code to a mobile device carried by the user; and causing, upon receiving the security code, an application module running on the mobile device to automatically send a push notification regarding location information of the user to a security module operated by a local authority.

According to another aspect of the present disclosure, the method may further include: maintaining constant communication between the application module and the security module by sending the push notification from the application module to the security module on predetermined time delta intervals.

According to a further aspect of the present disclosure, the push notification may include user's current location data.

According to yet another aspect of the present disclosure, the method may further include: terminating the communication between the application module and the security module when a notification regarding the user's safety is confirmed by the application module or the security module.

According to another aspect of the present disclosure, a system for implementing a multi-tier intercommunication module by utilizing one or more processors and one or more memories is disclosed. The system may include a database, a receiver, a processor, and a communication network. The database may store a first personal identification number (PIN) and a second PIN different from the first PIN associated with a card transaction. The receiver may be configured to receive a user input inputted by a user of an ATM machine conducting the card transaction. The processor may be specifically configured for verifying whether the user input matches the first PIN or the second PIN; and authenticating the user, in response to verifying, to allow completion of the card transaction via the ATM. When it is verified by the processor that the user input matches the second PIN, the processor may be further specifically configured for transmitting a security code to a mobile device carried by the user; and causing, upon receiving the security code, an application module running on the mobile device to automatically send a push notification regarding location information of the user to a security module operated by a local authority.

According to an additional aspect of the present disclosure, the processor may be further configured to: maintain constant communication between the application module and the security module by sending the push notification from the application module to the security module on predetermined time delta intervals.

According to yet another aspect of the present disclosure, the processor may be further configured to: terminate the communication between the application module and the security module when a notification regarding the user's safety is confirmed by the application module or the security module.

According to a further aspect of the present disclosure, a non-transitory computer readable medium configured to store instructions for implementing a multi-tier intercommunication module is provided. When executed, the instructions may cause a processor to perform the following: storing, on to a memory, a first personal identification number (PIN) and a second PIN different from the first PIN associated with a card transaction; receiving a user input onto an automatic teller machine (ATM); verifying whether the user input matches the first PIN or the second PIN; and authenticating the user, in response to verifying, to allow completion of the card transaction via the ATM. When it is verified that the user input matches the second PIN, when executed, the instructions may further cause the processor to perform the following: transmitting a security code to a mobile device carried by the user; and causing, upon receiving the security code, an application module running on the mobile device to automatically send a push notification regarding location information of the user to a security module operated by a local authority.

According to yet another aspect of the present disclosure, a method for implementing a multi-tier intercommunication module by utilizing one or more processors and one or more memories is disclosed. The method may include: storing, on to a memory, a personal identification number (PIN) associated with a user's account, registration information of a user's multi-factor authentication (MFA) device associated with the user's account, and a set of predefined rules associated with historical data corresponding to the user's normal transactional behaviors; receiving a user input onto an automatic teller machine (ATM) to request an ATM transaction; detecting an anomaly in the requested ATM transaction by analyzing the historical data, applying machine learning algorithm, and comparing the requested ATM transaction with the set of predefined rules; and sending a verification request to the user's registered MFA device upon detection of the anomaly for denying or accepting the requested ATM transaction.

According to a further aspect of the present disclosure, the method may further include: denying the requested ATM transaction, by utilizing the user's registered MFA device, when the user determines that the requested transaction is fraudulent; and cancelling the requested ATM transaction.

According to another aspect of the present disclosure, the method may further include: locking the user's account for further transactions for a predetermined amount of time.

According to yet another aspect of the present disclosure, the method may further include: accepting the requested ATM transaction, by utilizing the user's registered MFA device, when the user determines that the requested transaction is not fraudulent; and completing the ATM transaction upon verifying authenticity of the PIN.

According to a further aspect of the present disclosure, the set of predefined business rules may include one or more of the following: prior failed PIN attempts, user's usual transaction time period and location, and requested transaction amount exceeding a certain threshold, but the disclosure is not limited thereto.

According to another aspect of the present disclosure, a system for implementing a multi-tier intercommunication module by utilizing one or more processors and one or more memories is disclosed. The system may include a database, a receiver, a processor, and a communication network. The database may store a personal identification number (PIN) associated with a user's account, registration information of a user's multi-factor authentication (MFA) device associated with the user's account, and a set of predefined rules associated with historical data corresponding to the user's normal transactional behaviors. The receiver may receive a user input onto an automatic teller machine (ATM) to request an ATM transaction. The processor may be specifically configured for detecting an anomaly in the requested ATM transaction by analyzing the historical data, applying machine learning algorithm, and comparing the requested ATM transaction with the set of predefined rules; and sending a verification request to the user's registered MFA device upon detection of the anomaly for denying or accepting the requested ATM transaction.

According to a further aspect of the present disclosure, the processor may be further configured to: deny the requested ATM transaction, by utilizing the user's registered MFA device, when the user determines that the requested transaction is fraudulent; and cancel the requested ATM transaction.

According to another aspect of the present disclosure, the processor may be further configured to: lock the user's account for further transactions for a predetermined amount of time.

According to yet another aspect of the present disclosure, the processor may be further configured to: accept the requested ATM transaction, by utilizing the user's registered MFA device, when the user determines that the requested transaction is not fraudulent; and completing the ATM transaction upon verifying authenticity of the PIN.

According to a further aspect of the present disclosure, a non-transitory computer readable medium configured to store instructions for implementing a multi-tier intercommunication module is provided. When executed, the instructions may cause a processor to perform the following: storing, on to a memory, a personal identification number (PIN) associated with a user's account, registration information of a user's multi-factor authentication (MFA) device associated with the user's account, and a set of predefined rules associated with historical data corresponding to the user's normal transactional behaviors; receiving a user input onto an automatic teller machine (ATM) to request an ATM transaction; detecting an anomaly in the requested ATM transaction by analyzing the historical data, applying machine learning algorithm, and comparing the requested ATM transaction with the set of predefined rules; and sending a verification request to the user's registered MFA device upon detection of the anomaly for denying or accepting the requested ATM transaction.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
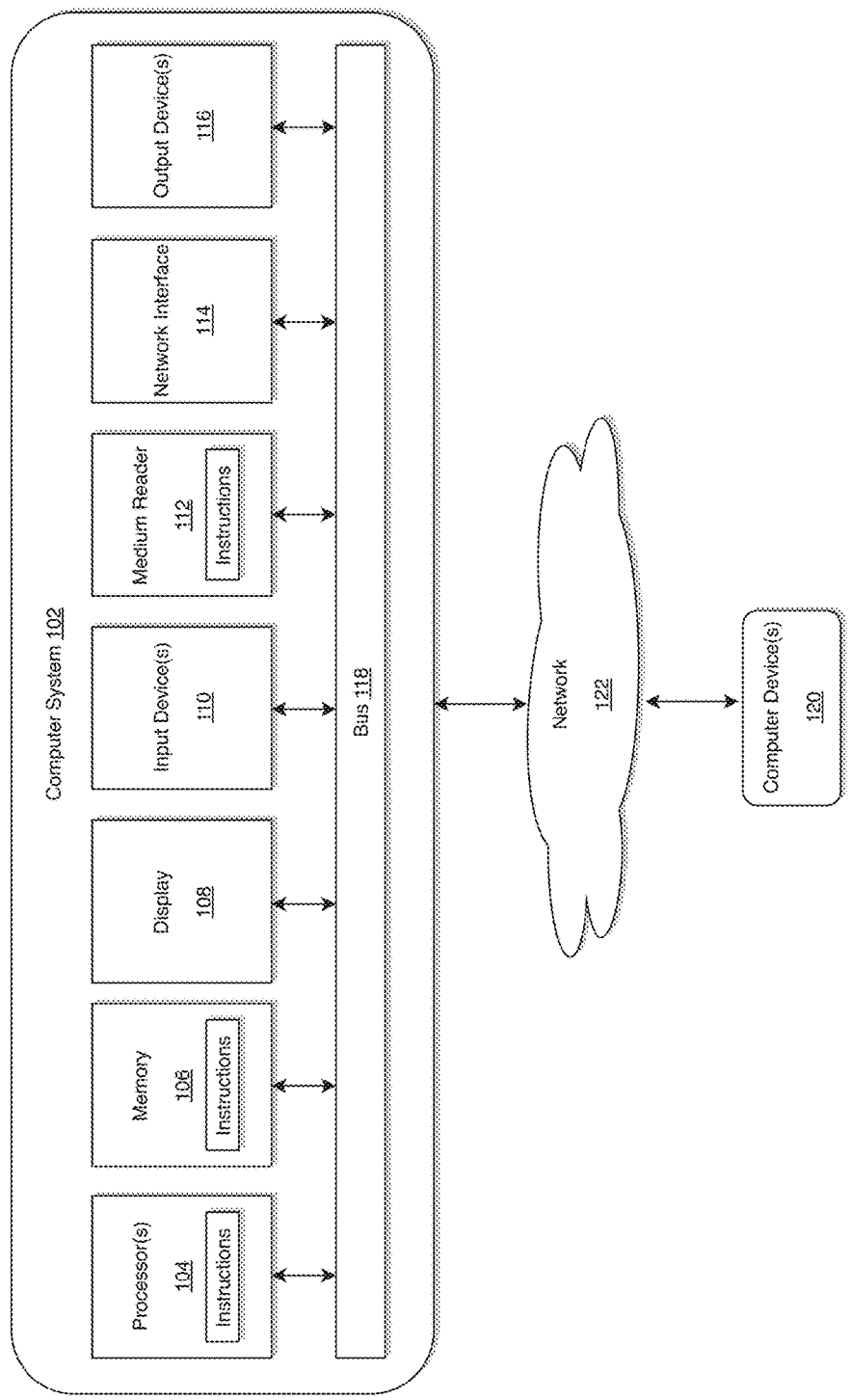
FIG. 1 illustrates a computer system for implementing a multi-tier intercommunication module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a multi-tier intercommunication module for leveraging MFA in preventing fraud within ATM systems, reducing the number of forced ATM transactions, and ensuring ATM user's safety. As further described herein, the various aspects, embodiments, features, and/or sub-components provide optimized processes of implementing a multi-tier intercommunication module by integrating multi-tier intercommunication system and ATMs with MFA technology to allow constant communication, through push notifications, between, for example, an ATM user's mobile phone, an ATM where a forced transaction (e.g., while the ATM user is forced by a robber to conduct an ATM transaction without ATM user's free will) may be occurring, and a security system operated by a local authority, thereby ensuring and enhancing safety of the ATM user. As described herein, various embodiments also provide optimized processes of implementing a multi-tier intercommunication module for integrating multi-tier intercommunication system and ATMs with MFA technology to allow detection and prevention of fraudulent ATM transactions by an unauthorized possessor of an ATM card or any equivalents thereof (e.g., a smartphone or equivalent technology that may be utilized to replace ATM cards).

Figure 2:
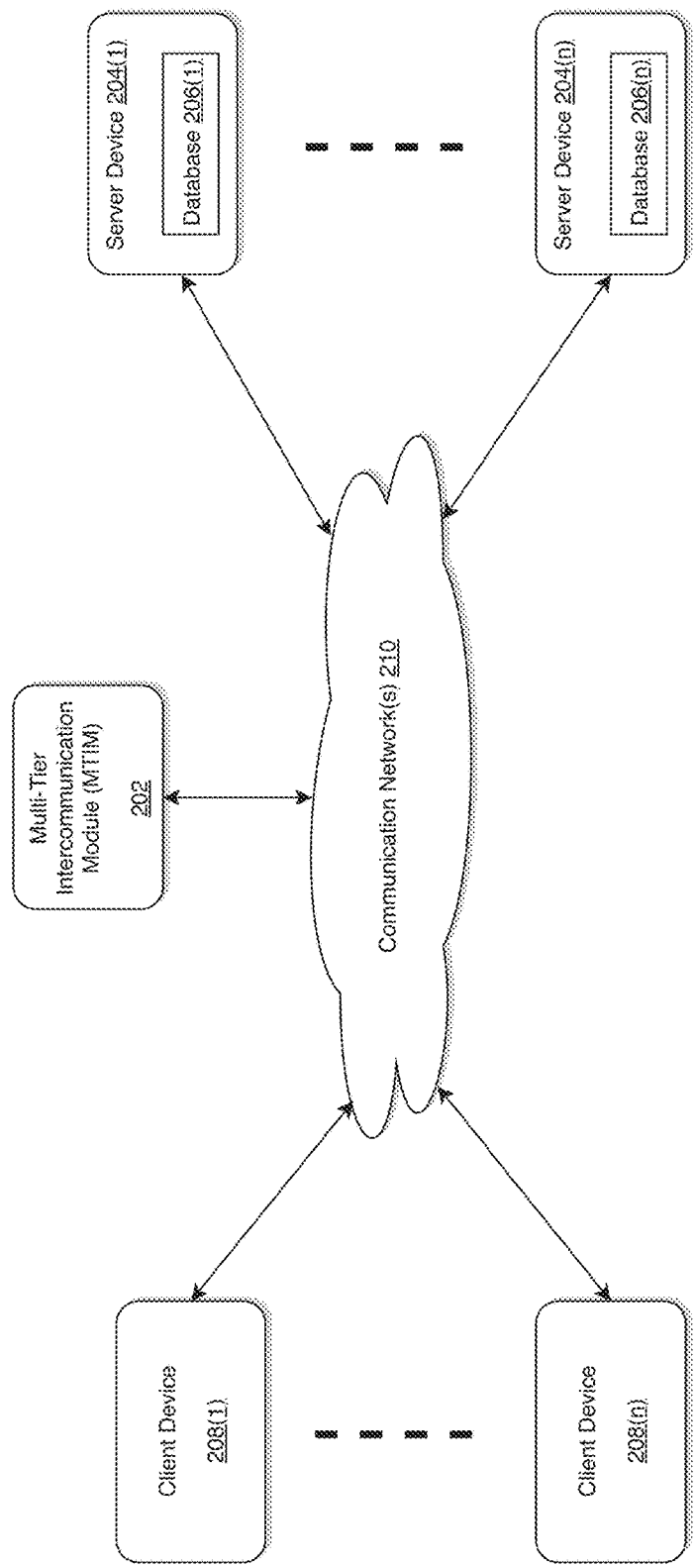
FIG. 2 illustrates an exemplary diagram of a network environment with a multi-tier intercommunication module in accordance with an exemplary embodiment.

Referring to FIG. 2, a schematic of an exemplary network environment 200 for implementing a multi-tier intercommunication module (MTIM) of the instant disclosure is illustrated.

Conventional system, that does not implement an MTIM of the instant disclosure, may not be able to detect that a forced transaction is occurring at the ATM, and may not be able to send push notifications to a local authority, and therefore, the security of the ATM user may not be ensured.

According to exemplary embodiments, the above-described problems associated with conventional approach of ATM transaction may be overcome by implementing an MTIM 202 as illustrated in FIG. 2. The MTIM 202 may be the same or similar to the computer system 102 as described with respect to FIG. 1. According to exemplary embodiments, the MTIM 202 may be considered to be a two-way interactive communication device such as a mobile computing device, cellular phone, landline phone or an Internet appliance controller.

The MTIM 202 may store one or more applications that can include executable instructions that, when executed by the MTIM 202, cause the MTIM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MTIM 202 itself, may be located in virtual server(s) running in a cloud-based computing environment rather than being tied to one or more specific physical network computing devices. Also, the application(s) may be running in one or more virtual machines (VMs) executing on the MTIM 202. Additionally, in one or more embodiments of this technology, virtual machine(s) running on the MTIM 202 may be managed or supervised by a hypervisor.

In the network environment 200 of FIG. 2, the MTIM 202 is coupled to a plurality of server devices 204(1)-204(n) that hosts a plurality of databases 206(1)-206(n), and also to a plurality of client devices 208(1)-208(n) via communication network(s) 210. A communication interface of the MTIM 202, such as the network interface 114 of the computer system 102 of FIG. 1, operatively couples and communicates between the MTIM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MTIM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MTIM 202 that efficiently send push notifications that include the ATM user's current location data to a security system operated by a local authority or to mobile device operated by a third party so that the local authority or the third party may offer help to ensure the ATM user's safety who is being forced by a robber to conduct an ATM transaction.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MTIM 202 may be a standalone device or integrated with one or more other devices or apparatuses, such as one or more of the server devices 204(1)-204(n), for example. In one particular example, the MTIM 202 may be hosted by one of the server devices 204(1)-204(n), and other arrangements are also possible. Moreover, one or more of the devices of the MTIM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MTIM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n).

Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MTIM 202 that may efficiently send push notifications that include the ATM user's current location data to a security system operated by a local authority or to mobile device operated by a third party so that the local authority or the third party may offer help to ensure the ATM user's safety who is being forced by a robber to conduct an ATM transaction. According to exemplary embodiments, the client devices 208(1)-208(n) in this example may further include any type of computing device that can facilitate the implementation of the MTIM 202 that may allow integrating multi-tier intercommunication system and ATMs with MFA technology, thereby allowing detection and prevention of fraudulent ATM transactions by an unauthorized possessor of an ATM card or any equivalents thereof (e.g., a smartphone or equivalent technology that may be utilized to replace ATM cards). Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the MTIM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MTIM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MTIM 202, the server devices 204(1)-204(n), or the client devices 208(1)-208(n), for example, may be configured to operate as virtual instances on the same physical machine. For example, one or more of the MTIM 202, the server devices 204(1)-204(n), or the client devices 208(1)-208(n) may operate on the same physical device rather than as separate devices communicating through communication network(s) 210. Additionally, there may be more or fewer MTIMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
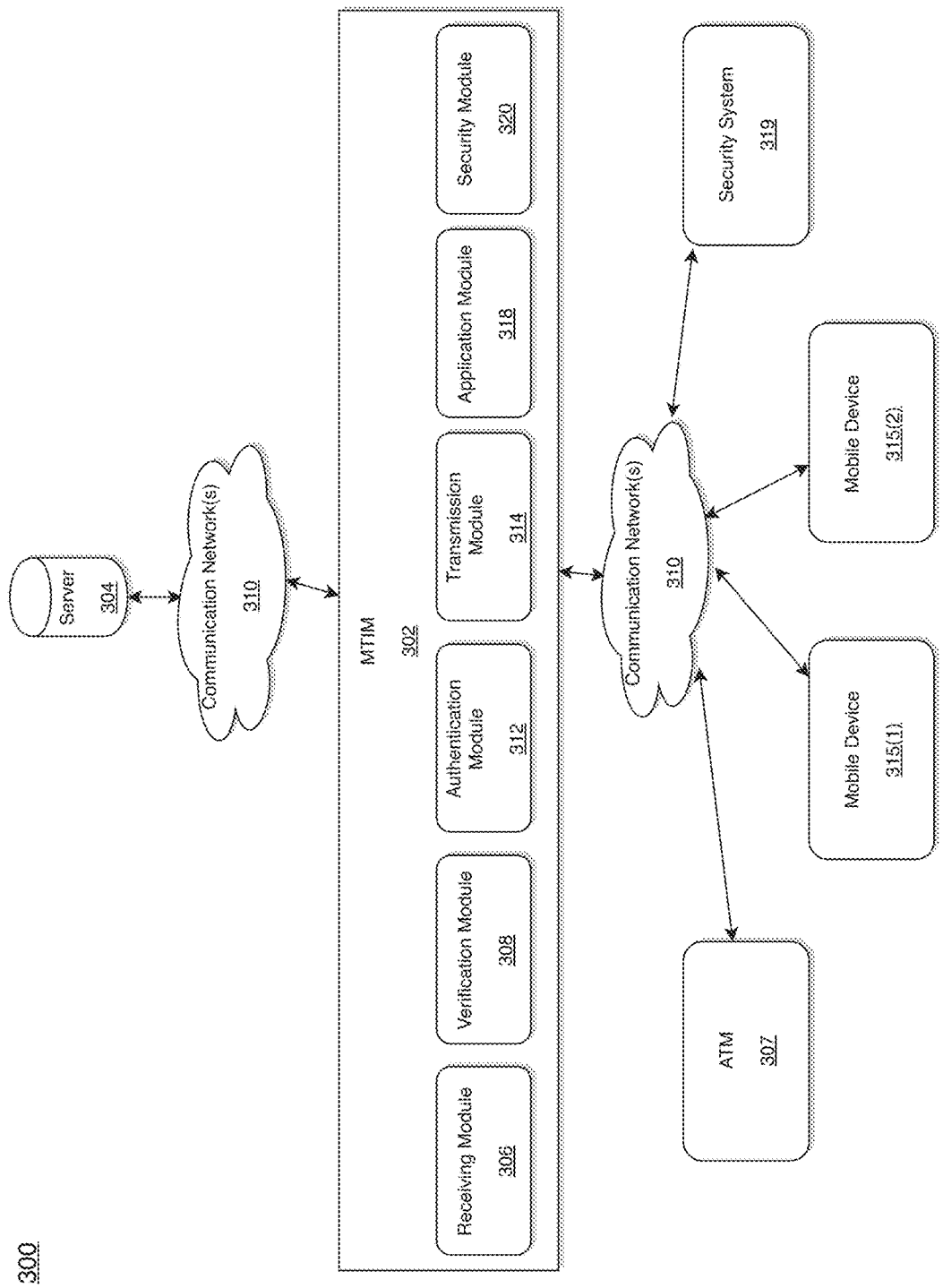
FIG. 3 illustrates a system diagram for implementing a multi-tier intercommunication module in accordance with an exemplary embodiment.

According to exemplary embodiments, a system 300 is described and shown in FIG. 3 as including an MTIM 302, although it may include other rules, policies, modules, databases, or applications, for example. As will be described below, the MTIM 302 may be configured to automatically send push notifications that include an ATM user's current location data to a security system operated by a local authority or to mobile device operated by a third party in an efficient manner by utilizing an application embedded within a mobile device carried by the ATM user. As will be described below, the MTIM 302 may be further configured to automatically integrate multi-tier intercommunication system and ATMs with MFA technology to allow detection and prevention of fraudulent ATM transactions by an unauthorized possessor of an ATM card or any equivalents thereof (e.g., a smartphone or equivalent technology that may be utilized to replace ATM cards).

An exemplary system 300 for automatically accessing verification data stored on a server 304 (e.g., a database) and sending push notifications to security system operated by a local authority or to a mobile device operated by a third party in an efficient manner by utilizing an MTIM, and by utilizing the network environment(s) 310 is shown as being executed in FIG. 3. Specifically, an ATM 307, one or more mobile devices 315(1), 315(2), and one or more security systems 319 are illustrated as being in communication with the MTIM 302 via the network environment(s). According to exemplary embodiments, mobile device 315(1) may be an ATM user's mobile device and mobile device 315(2) may be a third party's mobile device. According to exemplary embodiments, the network environment(s) 310 may be same network environment(s) 210 as illustrated in FIG. 2. As shown in FIG. 3, the MTIM 302 may include a receiving module 306, a verification module 308, an authentication module 312, a transmission module 314, an application module 318, and a security module 320.

According to exemplary embodiments, each of the receiving module 306, verification module 308, authentication module 312, transmission module 314, application module 318, and the security module 320 may be implemented by microprocessors or similar, they may be programmed using software (e.g., microcode) to perform various functions discussed herein and may optionally be driven by firmware and/or software. Alternatively, each of the receiving module 306, verification module 308, authentication module 312, transmission module 314, application module 318, and the security module 320 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 306, verification module 308, authentication module 312, transmission module 314, application module 318, and the security module 320 may be physically separated into two or more interacting and discrete blocks, units, devices, and/or modules without departing from the scope of the inventive concepts.

Although FIG. 3 illustrates that the security module 320 is embedded within the MTIM 302, the disclosure is not limited thereto. For example, according to an alternative embodiment, the security module 320 may be embedded within the security system 319. Although FIG. 3 illustrates that the receiving module 306 is embedded within the MTIM 302, the disclosure is not limited thereto. For example, according to an alternative embodiment, the receiving module 306 may be embedded within the ATM 307. Although FIG. 3 illustrates that the application module 318 is embedded within the MTIM 302, the disclosure is not limited thereto. For example, according to an alternative embodiment, the application module 318 may be embedded within the mobile device 315(1) of the ATM user and/or the mobile device 315(2) of the third party. The mobile devices 315(1), 315(2) may be the same as any one of the client devices 208(1) . . . 208(n) as illustrated in FIG. 2. According to exemplary embodiments, each of the mobile devices 315(1), 315(2) may be, for example, a smart phone. Of course, each of the mobile devices 315(1), 315(2) may be any additional device described herein.

The process may be executed via the communication network(s) 310, which may comprise plural networks as described above. For example, in an exemplary embodiment, the ATM 307, either or both of the mobile devices 315(1), 315(2), and the security system 319 may communicate with the MTIM 302 via broadband or cellular communication. Of course, these embodiments are merely exemplary and are not limiting or exhaustive.

According to exemplary embodiments, the server 304 (e.g., a database) may store a first personal identification number (PIN) and a second PIN different from the first PIN associated with a card transaction initiated by the ATM user. The first PIN may be a general PIN that is utilized by the ATM user to conduct a normal card transaction when the user is not forced by a robber to conduct the ATM transaction. The second PIN may be an emergency PIN which the ATM user utilizes when he/she is being forced by a robber to conduct the ATM transaction.

When an ATM user enters a user input (i.e., the first PIN or the second PIN) onto the ATM 307, the receiving module 306 receives the user input. The receiving module 306 then sends a signal to the verification module 308 that the user input has been receive. Upon receiving the signal from the receiving module 306, the verification module 308 access the database 304 (e.g., a database) to verify whether the user input matches the first PIN or the second PIN. According to exemplary embodiments, the verification module 308 may implement any commonly known verification algorithms to determine whether the user input matches the first PIN or the second PIN. Upon verification, the verification module 308 sends a signal to the authentication module 312. Upon receiving the signal from the verification module 308, the authentication module 312 determines that the ATM user is authenticated to complete the ATM transaction, and therefore, the authentication module 312 allows the ATM to complete ATM transaction, i.e., by dispensing cash. According to exemplary embodiments, the authentication module 312 may implement any commonly known authentication algorithms to determine whether the ATM user is authenticated to complete the ATM transaction.

According to exemplary embodiments, when the verification module 308 verifies that the user input matches the first PIN, the authentication module 312 authenticates the ATM user to complete the ATM transaction without triggering any security event (which will be described later), and the process ends when the ATM 307 dispenses cash or otherwise indicates completion of the ATM transaction.

According to exemplary embodiments, when the verification module 308 verifies that the user input matches the second PIN, the authentication module 312 authenticates the ATM user to complete the ATM transaction by allowing the ATM 307 to dispense cash, and simultaneously triggers security events to be implemented by the MTIM 302. The security events may include, but are not limited to, transmitting, by utilizing the transmission module 314, a security code to a mobile device 315(1) carried by the user; and causing, upon receiving the security code, an application module 318 running on the mobile device 315(1) to automatically send a push notification regarding location information of the ATM user to a security module 320 operated by a local authority and/or to mobile device 315(2) operated by a third party.

According to an exemplary embodiment, a multi-tier intercommunication system and ATMs integrated with MFA technology as illustrated in FIG. 3 may allow constant communication between the ATM user's mobile device 315(1), the ATM 307 where a forced transaction is occurring, and the local authorities' security system 319 using of push notifications in order to ensure safety of the ATM user and to prevent further forced ATM transactions.

For example, the MTIM 302 may be initiated when the ATM user enters an emergency PIN (i.e., the second PIN different from the first PIN), or other MFA of the form something the ATM user knows. This emergency pin occurrence in the ATM 307 may signal to the ATM 307 that a forced transaction is occurring at which case the ATM 307 may dispense the cash and may cause the ATM user's MFA authentication device, e.g., his/her mobile device 315(1) to initiate further processing in the background (not visible at a screen of the mobile device 315(1)) without alerting the robber who is forcing the ATM user to conduct the ATM transaction.

According to exemplary embodiments, the ATM's 307 backend system may then trigger a distress signal by sending out a custom security code to the mobile device 315(1) in the form of an SMS message by utilizing the transmission module 314, and further utilizing MFA of the form something the ATM user has, i.e., his/her mobile device security code. The reception of this custom security code by the receiving module 306 may trigger a custom security event on the application module 318 embedded within the ATM user's mobile device 315(1), running as a background process. The application module's 318 global event listener may then process this security event by constantly polling the ATM user's current location and generating location data corresponding to the ATM user's current location. This location data may be sent, on predetermined time delta intervals, by the transmission module 314 to local authorities (i.e., the security module 320 operated by the local authorities) and any predefined emergency contacts stored in the server 304 (i.e., third parties contact information who utilize the mobile device 315(2)), running as a background process, thereby not alerting the robber of any suspicious activity, through the use of push notifications. Once the ATM user's safety has been confirmed, either by the ATM user himself or by local authorities, the push notifications may cease. For example, the MTIM 302 may terminate the communication between the application module 318 and the security module 320 when a notification regarding the ATM user's safety is confirmed by the application module 318 or the security module 320.

According to exemplary embodiments, the MTIM 302 may be further configured to scan bills taken from a forced transaction occurred at the ATM 307 and provides serial numbers associated with the stolen bills, thereby allowing easy identification and (potential) tracking ability for local law enforcement.

According to exemplary embodiments, the MTIM 302 may be further configured to address false positives, i.e., the ATM user accidentally entering the emergency pin (i.e., the second PIN). To address this false positive scenario, a new sub-section within an account section of the application module 318 may be provided with a hidden slider (not shown in FIG. 3) that may only appear in the screen of the mobile device 315(1) once the ATM user entered his/her emergency pin (i.e., the second PIN) and the ATM user's mobile device 315(1) has received a custom security event from the security module 320. This slider may allow the ATM user to deactivate the distress signal sent to local authorities as to not waste precious resources. Keeping this slider to remain hidden until a distress signal is received from the security module 320 and there being no general notifications on the mobile phone 315(1) about the distress signal is to not alert the robber of any suspicious activity, as it may be up to the ATM user to manually deactivate the distress signal if she/he is actually safe.

Figure 4:
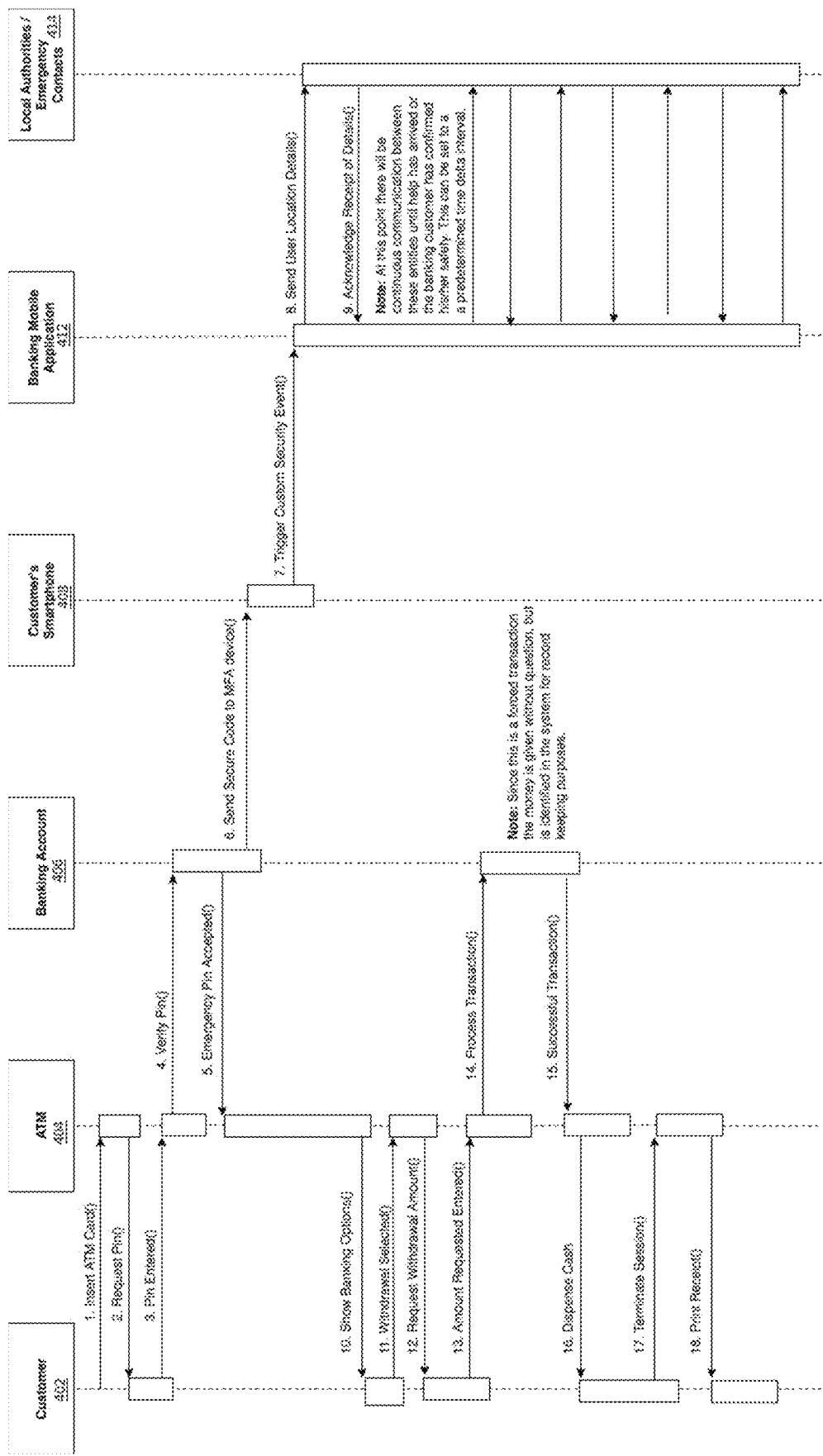
FIG. 4 illustrates a flow diagram for implementing a multi-tier intercommunication module in accordance with an exemplary embodiment.
Figure 5:
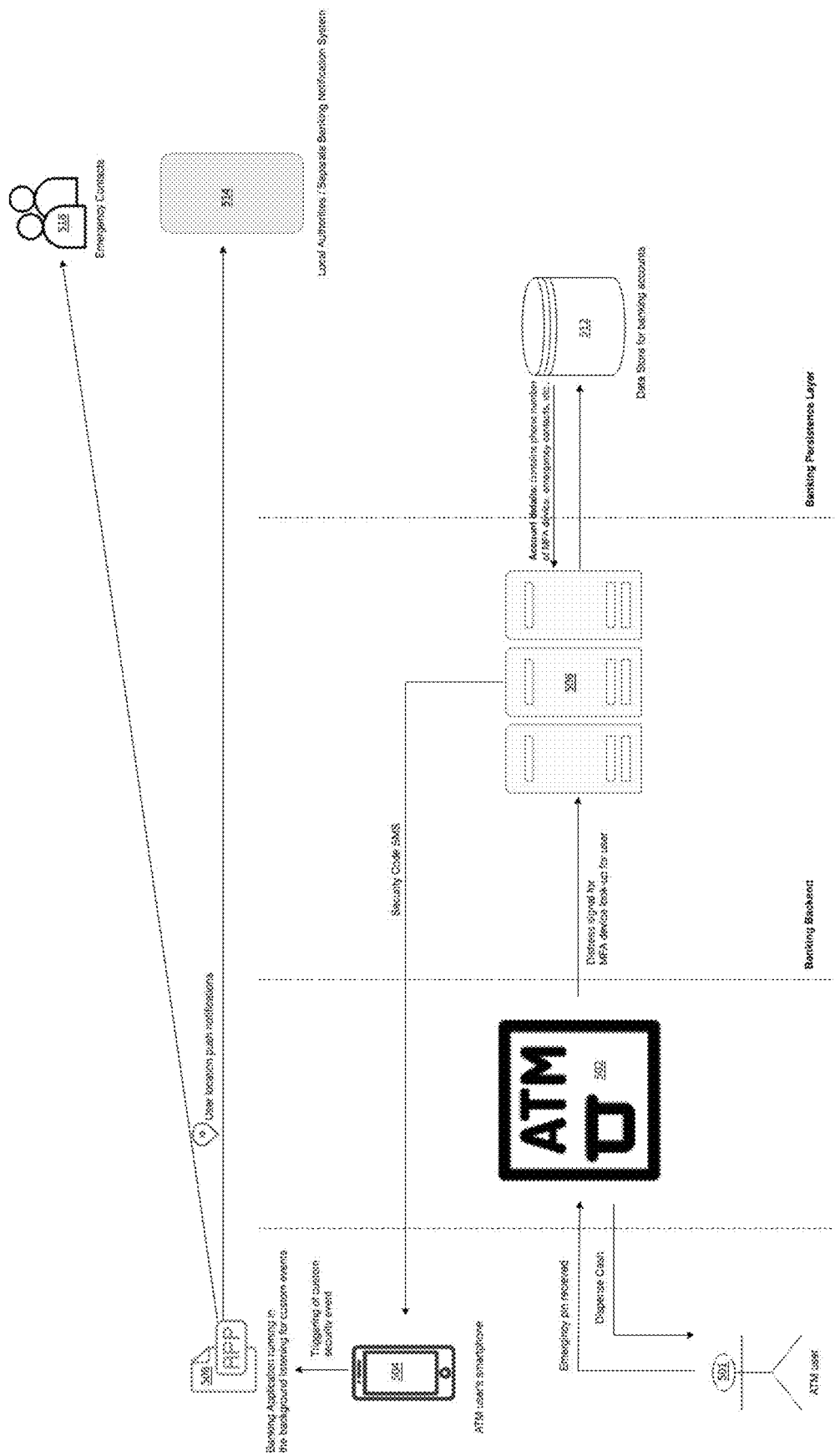
FIG. 5 illustrates a system diagram for implementing a multi-tier intercommunication module in accordance with an exemplary embodiment.

FIG. 4 illustrates a flow diagram for implementing a multi-tier intercommunication module in accordance with an exemplary embodiment and FIG. 5 illustrates a system diagram for implementing a multi-tier intercommunication module in accordance with an exemplary embodiment.

Referring to both FIGS. 4 and 5, according to exemplary embodiments, FIG. 4 illustrates a sequence of time events (1) through (18) when implementation of the MTIM 302 (as illustrated in FIG. 3) is triggered upon entering a PIN onto an ATM 404 (or ATM 502 as illustrated in FIG. 5) by a customer 402 (or ATM user 501 as illustrated in FIG. 5). At event (1), the customer 402 inserts a card for transaction into the ATM 404. At event (2), the ATM 404 requests a PIN. At event (3), the customer 402 enters a PIN by utilizing a touch pad (not shown) on the ATM 404. At event (4), the PIN is verified by a banking account 406 by accessing the database 512. At event (5), the banking account 406 (i.e., a banking backend system 506 as illustrated in FIG. 5) determines whether the PIN is a normal PIN or an emergency PIN. According to exemplary embodiments, only when the customer 402 enters an emergency PIN (i.e., the second PIN as discussed above with respect to FIG. 3) onto the ATM 404, instead of a normal PIN (i.e., the first PIN as discussed above with respect to FIG. 3), the transaction process completes events (6) through (18). According to exemplary embodiment, when the customer 402 enters a normal PIN, instead of an emergency PIN, only events (1) through (4) and (10)-(18) occurs to complete the transaction process.

According to exemplary embodiments, at event (6) the banking account 406 (or the banking backend system 506) sends a security code, e.g., as an SMS text to the customer's smartphone 408 (an MFA device) (i.e., mobile device 315(1) as illustrated in FIG. 3; ATM user's smartphone 504 as illustrated in FIG. 5) carried by the customer 402. At event (7), custom security event(s) is triggered upon receiving the security code by the customer's smartphone 408. At event (8), banking mobile application 412 (or banking application 508 as illustrated in FIG. 5), running as a background process within the customer's smartphone 408, sends push notifications that include customer's 402 current location data to a security system 514 operated by local authorities and/or to emergency contacts 414 (or emergency contacts 516 as illustrated in FIG. 5). At event (9), an acknowledgement is received from the security system 514 and/or from the emergency contacts 414/516 regarding the push notifications. At event (9), the MTIM 302 maintains constant communication between the banking mobile application 412 and the security system 514 operated by the local authorities until the local authority arrives at the customer's location or the customer 402 confirms his/her safety. At event (9), the MTIM 302 also maintains constant communication between the banking mobile application 412 and the emergency contacts 414/516 until the emergency contact arrives at the customer's location or the customer 402 confirms his/her safety.

According to exemplary embodiments, upon verifying either the normal PIN or the emergency PIN, at event (10), the ATM 404 displays selectable banking options to the customer 402. At event (11), the customer 402 selects withdrawal option. At event (12), withdrawal amount is requested by the ATM 404/502. At event (13), the customer enters requested amount. At event (14), the ATM 404/502 processes the transaction from the banking account 406. At event (15), the ATM 404/502 receives successful transaction notification from the banking account 406. At event (16), the ATM 404 dispenses cash equal to the requested amount. At event (17), the transaction is completed. At event (18), the ATM 404/502 prints a receipt of the transaction.

Figure 6:
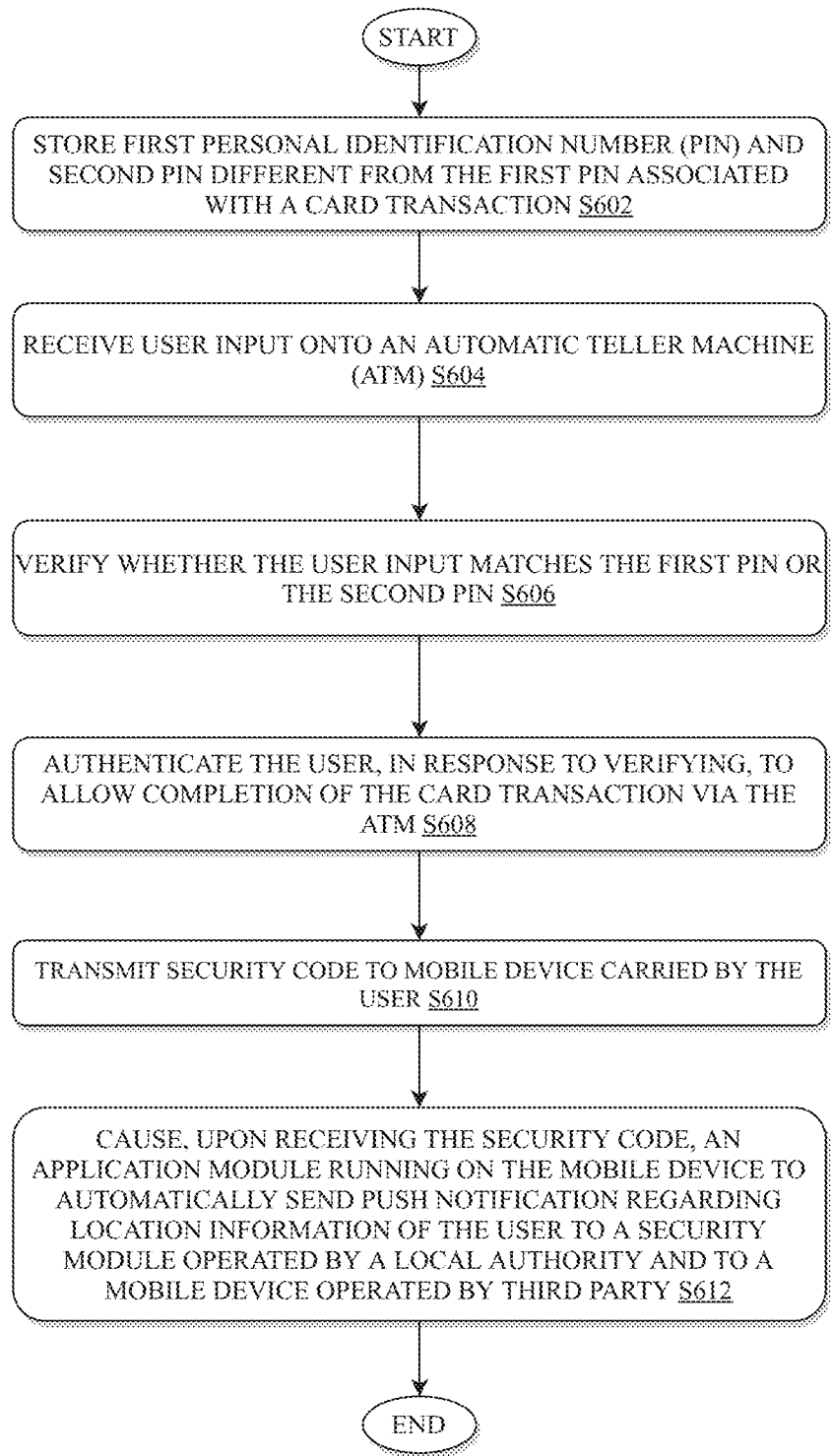
FIG. 6 illustrates a flow chart for implementing a multi-tier intercommunication module in accordance with an exemplary embodiment.

FIG. 6 illustrates a flow chart for implementing a MTIM in accordance with an exemplary embodiment. The MTIM may be the same or similar to the MTIMs illustrated herein with reference to FIGS. 2-5, but the disclosure is not limited thereto.

In the process 600 of FIG. 6, at step S602, a database may store, on to a memory, a first personal identification number (PIN) and a second PIN different from the first PIN associated with a card transaction. The database may be the same or similar to the servers illustrated herein with reference to FIGS. 2-5.

At step S604, a user input may be entered onto an ATM and the user input may be received by a receiving module. The ATM and the receiving module may be the same or similar to the ATMs and receiving modules illustrated herein with reference to FIGS. 2-5.

At step S606, the user input may be verified by a verification module by accessing the database to determine whether the user input matches the first PIN or the second PIN. The verification module may be the same or similar to the verification modules illustrated herein with reference to FIGS. 2-5.

At step S608, an authentication module may authenticate the ATM user, in response to verifying, to allow completion of the card transaction via the ATM. The authentication module may be the same or similar to the authentication modules illustrated herein with reference to FIGS. 2-5.

When it is verified that the user input matches the second PIN, at step S610, a transmission module transmits a security code to a mobile device carried by the ATM user. The transmission module may be the same or similar to the transmission modules illustrated herein with reference to FIGS. 2-5 and the mobile device may be the same or similar to the mobile devices illustrated herein with reference to FIGS. 2-5.

In addition, when it is verified that the user input matches the second PIN, at step S612, upon receiving the security code by the mobile device carried by the ATM user, an application module running on the mobile device carried by the ATM user to automatically send a push notification regarding location information of the ATM user to a security module operated by a local authority and to mobile device operated by a third party. The application module, the security module, and the mobile device may be the same or similar to the application modules, security modules, and mobile devices illustrated herein with reference to FIGS. 2-5.

According to exemplary embodiments, the process 600 may further include the step of maintaining constant communication between the application module and the security module by sending the push notification from the application module to the security module on predetermined time delta intervals.

According to exemplar embodiments, the process 600 may further include a step of terminating the communication between the application module and the security module when a notification regarding the user's safety is confirmed by the application module or the security module.

According to exemplary embodiments, at step S606, when the verification module verifies that the user input matches the first PIN, the authentication module authenticates, at step S608, the ATM user to complete the ATM transaction without triggering any security event, and the process ends when the ATM dispenses cash or otherwise indicates completion of the ATM transaction.

According to exemplary embodiments, the process 600 may further include steps of scanning bills taken from a forced transaction occurred at the ATM 307 and providing serial numbers associated with the stolen bills, thereby allowing easy identification and (potential) tracking ability for tracking stolen bills for local law enforcement.

According to exemplary embodiments, the process 600 may further include steps of addressing false positives, i.e., the ATM user accidentally entering the emergency pin (i.e., the second PIN). To address this false positive scenario, the process may include a step of adding a new sub-section within an account section of the application module to be provided with a hidden slider (not shown) that may only appear in the screen of the mobile device 315(1) once the ATM user entered his/her emergency pin (i.e., the second PIN) and the ATM user's mobile device 315(1) has received a custom security event from the security module 320. The process 600 may further include a step of deactivating the distress signal by allowing the ATM user to turn off the slider by sliding in a predetermined direction. The reason this slider may remain hidden until a distress signal is received and there may be no general notifications on the mobile phone 315(1) about the distress signal is to not alert the robber of any suspicious activity, as it may be up to the ATM user to manually deactivate the distress signal if she/he is actually safe.

Figure 7:
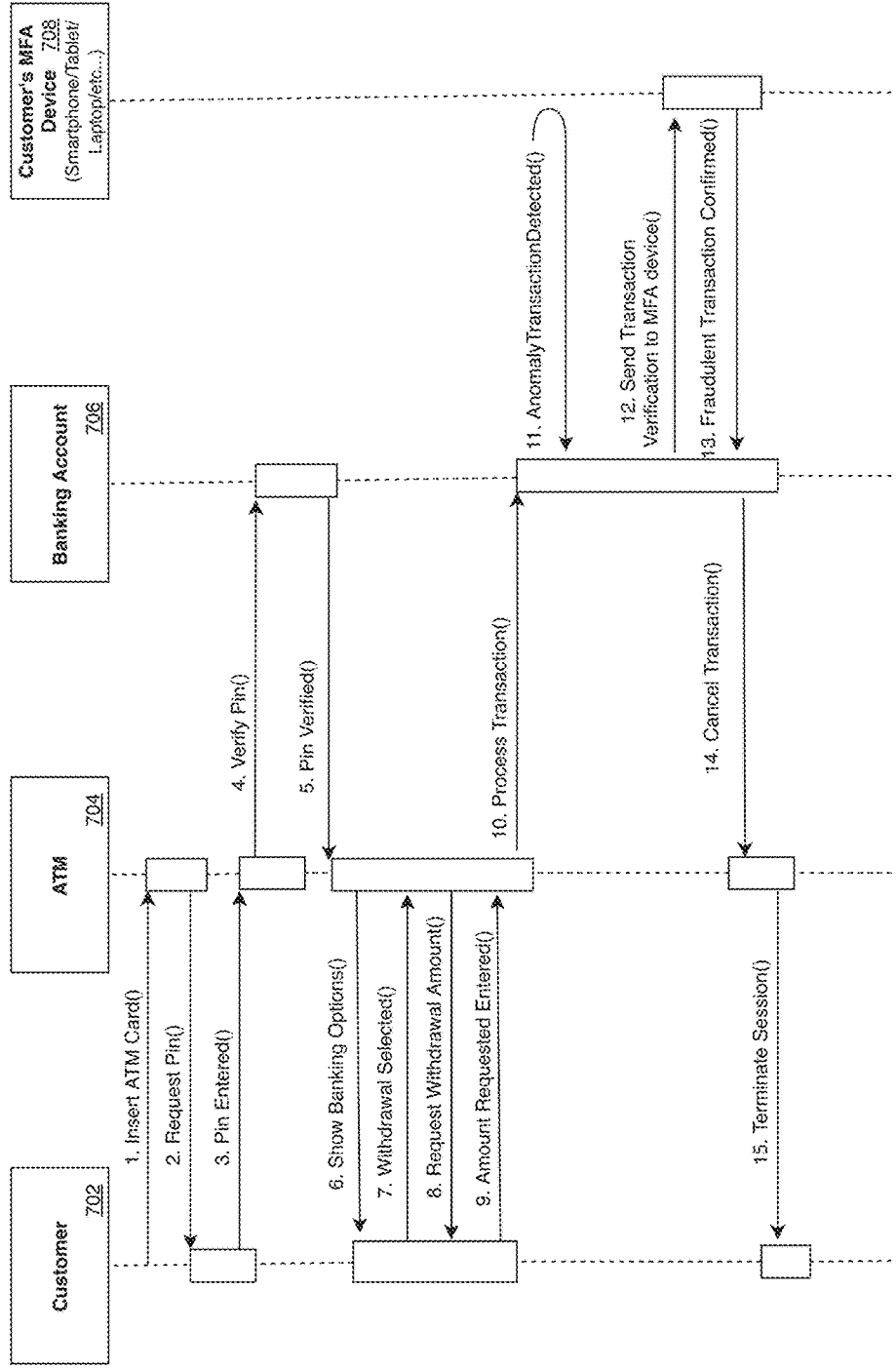
FIG. 7 illustrates another flow diagram for implementing a multi-tier intercommunication module in accordance with another exemplary embodiment.

FIG. 7 illustrates another flow diagram 700 for implementing a multi-tier intercommunication module in accordance with an exemplary embodiment. According to exemplary embodiments, FIG. 7 illustrates a sequence of time events (1) through (15) when implementation of the MTIM 302 (as illustrated in FIG. 3) is triggered upon entering a PIN onto an ATM 704 by a customer 702.

Referring to FIGS. 3 and 7, the server 304 may include memories that store a personal identification number (PIN) associated with a customer's bank account 706, registration information of customer's multi-factor authentication (MFA) device 708 (e.g., smartphone, tablet, laptop, etc.) associated with the customer's bank account 706, and a set of predefined rules associated with historical data corresponding to the customer's 702 normal transactional behaviors. According to exemplary embodiments, the set of predefined business rules may include one or more of the following: prior failed PIN attempts, customer's 702 usual transaction time period and location, and requested transaction amount exceeding a certain threshold of customer's 702 usual transaction, but the disclosure is not limited thereto. According to exemplary embodiments, receiving module 306 of the MTIM 302 may be configured to receive a user input from a customer 702 onto the ATM 704 to request an ATM transaction.

Referring again to FIGS. 3 and 7, according to exemplary embodiments, at event (1), the customer 702 inserts a card for transaction into the ATM 704. At event (2), the ATM 704 requests a PIN. At event (3), the customer 702 enters a PIN by utilizing a touch pad (not shown) on the ATM 704. At event (4), the PIN is verified by the banking account 706 by accessing the server 304. At event (5), the banking account 706 (i.e., a banking backend system) determines whether the PIN is authentic that corresponds to the banking account 706.

According to exemplary embodiments, upon verifying the PIN, at event (6), the ATM 704 displays selectable banking options to the customer 702. At event (7), the customer 702 selects withdrawal option. At event (8), withdrawal amount is requested by the ATM 704. At event (9), the customer 702 enters requested amount. At event (10), the ATM 704 initiates processing of the transaction from the banking account 706.

According to exemplary embodiments, at event (11), the MTIM 302 may be configured to detect an anomaly in the requested ATM transaction initiated by the ATM 704 by analyzing the historical data, applying machine learning algorithm, and comparing the requested ATM transaction with the set of predefined rules. For example, the detection of anomaly transactions by the MTIM 302 may be determined by analyzing a customer's 702 normal banking behaviors and leveraging machine learning algorithm as well as comparing against the set of predefined business rules such as prior failed PIN attempts, requested amount above a certain threshold, as well as the customer's 702 usual transaction request time period and location, etc., but the disclosure is not limited thereto. At event (12), the verification module 308 may be configured to send a verification request to the customer's registered MFA device 708 upon detection of the anomaly.

According to exemplary embodiments, at event (13), fraudulent transaction may be confirmed by the customer's MFA device 708. For example, when the customer 702 determines, based on receiving the verification notification via the customer's registered MFA device 708, that he/she is not the customer who is attempting this the ATM transaction, the customer 702 denies the requested ATM transaction by utilizing the customer's registered MFA device 708. Upon receiving fraudulent transaction confirmation from the customer's registered MFA device 708, the MTIM 302 cancels the ATM transaction at event (14) and terminates the session at event (15). According to exemplary embodiments, the MTIM 302 may be configured to execute lock or hold on the customer's bank account 706 for further transactions for a predetermined amount of time upon receiving fraudulent transaction confirmation from the customer's registered MFA device 708.

However, when the customer 702 determines, based on receiving the verification notification via the customer's registered MFA device 708, that he/she is the customer who is attempting the ATM transaction, the customer 702 accepts the requested ATM transaction by utilizing the customer's registered MFA device 708. Upon receiving transaction confirmation from the customer's registered MFA device 708 that the transaction is not fraudulent, the MTIM 302 completes the transaction by allowing the ATM 704 to dispense the requested amount.

Figure 8:
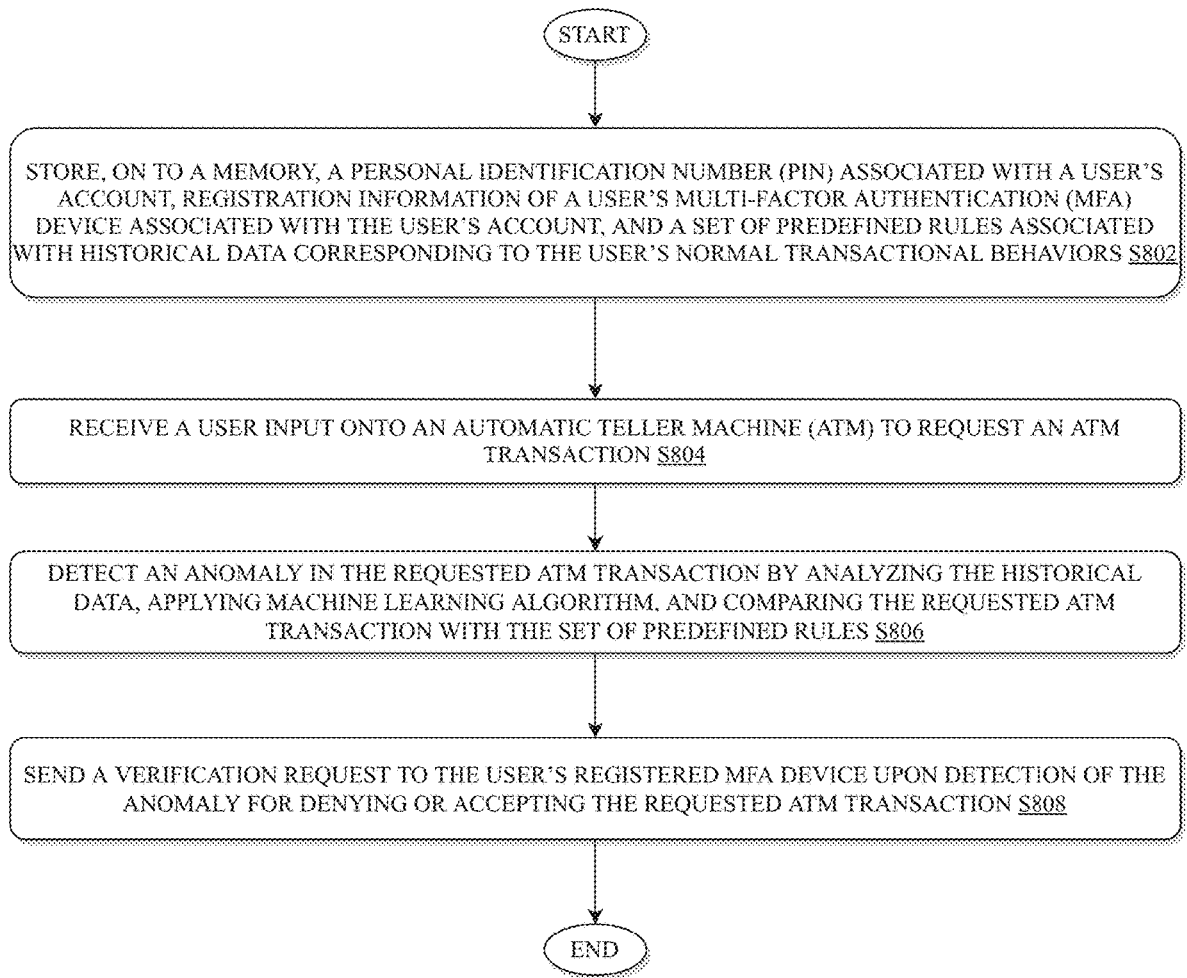
FIG. 8 illustrates a flow chart for implementing a multi-tier intercommunication module in accordance with another exemplary embodiment.

FIG. 8 illustrates a flow chart for implementing a MTIM in accordance with an exemplary embodiment. The MTIM may be the same or similar to the MTIMs illustrated herein with reference to FIGS. 2-3, but the disclosure is not limited thereto.

In the process 800 of FIG. 8, at step S802, a database may store, on to a memory, a personal identification number (PIN) associated with a user's account, registration information of a user's multi-factor authentication (MFA) device associated with the user's account, and a set of predefined rules associated with historical data corresponding to the user's normal transactional behaviors.

At step S804, a user input may be entered onto an ATM to request an ATM transaction and the user input may be received by a receiving module. The ATM and the receiving module may be the same or similar to the ATMs and receiving modules illustrated herein with reference to FIGS. 2-5 and 7.

At step S806, an anomaly in the requested ATM transaction may be detected by analyzing the historical data, applying machine learning algorithm, and comparing the requested ATM transaction with the set of predefined rules.

At step S808, a verification request may be sent to the user's registered MFA device upon detection of the anomaly for denying or accepting the requested ATM transaction.

According to exemplary embodiments, the process 800 may further include: denying the requested ATM transaction, by utilizing the user's registered MFA device, when the user determines that the requested transaction is fraudulent; and cancelling the requested ATM transaction.

According to exemplar embodiments, the process 800 may further include: locking or holding the user's account for further transactions for a predetermined amount of time.

According to exemplary embodiments, the process 800 may further include: accepting the requested ATM transaction, by utilizing the user's registered MFA device, when the user determines that the requested transaction is not fraudulent; and completing the ATM transaction upon verifying authenticity of the PIN.

According to exemplary embodiments, a non-transitory computer readable medium may be configured to store instructions for implementing a multi-tier intercommunication module. According to exemplary embodiments, the instructions, when executed, may cause a processor embedded within the MTIM 302 to perform the following: storing, on to a memory, a first personal identification number (PIN) and a second PIN different from the first PIN associated with a card transaction; receiving a user input onto an ATM; verifying whether the user input matches the first PIN or the second PIN; and authenticating the user, in response to verifying, to allow completion of the card transaction via the ATM. When it is verified that the user input matches the second PIN, the instructions, when executed, may further cause the processor embedded within the MTIM 302 to perform the following: transmitting a security code to a mobile device carried by the user; and causing, upon receiving the security code, an application module running on the mobile device to automatically send a push notification regarding location information of the user to a security module operated by a local authority. The processor embedded within the MTIM 302 may be the same or similar to the processor 104 as illustrated in FIG. 1 or the processor embedded within MTIM 202.

According to exemplary embodiments, the instructions, when executed, may further cause the processor embedded within the MTIM 302 to perform the following: maintaining constant communication between the application module and the security module by sending the push notification from the application module to the security module on predetermined time delta intervals.

According to exemplary embodiments, the instructions, when executed, may further cause the processor embedded within the MTIM 302 to perform the following: terminating the communication between the application module and the security module when a notification regarding the user's safety is confirmed by the application module or the security module.

According to exemplary embodiments, a non-transitory computer readable medium may be configured to store instructions for implementing a multi-tier intercommunication module. According to exemplary embodiments, the instructions, when executed, may cause a processor embedded within the MTIM 302 to perform the following: storing, on to a memory, a personal identification number (PIN) associated with a user's account, registration information of a user's multi-factor authentication (MFA) device associated with the user's account, and a set of predefined rules associated with historical data corresponding to the user's normal transactional behaviors; receiving a user input onto an automatic teller machine (ATM) to request an ATM transaction; detecting an anomaly in the requested ATM transaction by analyzing the historical data, applying machine learning algorithm, and comparing the requested ATM transaction with the set of predefined rules; and sending a verification request to the user's registered MFA device upon detection of the anomaly for denying or accepting the requested ATM transaction.

According to exemplary embodiments, the instructions, when executed, may further cause the processor embedded within the MTIM 302 to perform the following: denying the requested ATM transaction, by utilizing the user's registered MFA device, when the user determines that the requested transaction is fraudulent; and cancelling the requested ATM transaction.

According to exemplary embodiments, the instructions, when executed, may further cause the processor embedded within the MTIM 302 to perform the following: locking or holding the user's account for further transactions for a predetermined amount of time.

According to exemplary embodiments, the instructions, when executed, may further cause the processor embedded within the MTIM 302 to perform the following: accepting the requested ATM transaction, by utilizing the user's registered MFA device, when the user determines that the requested transaction is not fraudulent; and completing the ATM transaction upon verifying authenticity of the PIN.

According to exemplary embodiments as disclosed above in FIGS. 1-8, technical improvements effected by the instant disclosure may include implementing a multi-tier intercommunication module for leveraging MFA in preventing fraud within ATM systems, reducing the number of forced ATM transactions, and ensuring ATM user's safety. The various aspects, embodiments, features, and/or sub-components provide optimized processes of implementing a multi-tier intercommunication module by integrating multi-tier intercommunication system and ATMs with MFA technology to allow constant communication, through push notifications, between, for example, an ATM user's mobile phone, an ATM where a forced transaction (e.g., while the ATM user is forced by a robber to conduct an ATM transaction without ATM user's free will) may be occurring, and a security system operated by a local authority, thereby ensuring and enhancing safety of the ATM user. According to exemplary embodiments as disclosed above in FIGS. 1-8, technical improvements effected by the instant disclosure may further include implementing a multi-tier intercommunication module by integrating multi-tier intercommunication system and ATMs with MFA technology to allow detection and prevention of fraudulent ATM transactions by an unauthorized possessor of an ATM card or any equivalents thereof (e.g., a smartphone or equivalent technology that may be utilized to replace ATM cards).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a multi-tier intercommunication module by utilizing one or more processors and one or more memories, the method comprising:
   storing, on to a memory, a first personal identification number (PIN) and a second PIN different from the first PIN associated with a card transaction, wherein the first PIN is a general PIN that is utilized by an automatic teller machine (ATM) user to conduct a normal card transaction when the user is not under duress to complete the card transaction, wherein the second PIN is an emergency PIN which the ATM user utilizes when the user is under duress to complete the card transaction, and wherein each of the first PIN and the second PIN individually allows completing the card transaction;
   receiving a user input onto the ATM;
   verifying whether the user input matches the first PIN;
   authenticating the user in response to verifying the first PIN by accessing the memory;
   determining that the user is not under duress based on verifying authenticity of the first PIN and allowing completion of the card transaction via the ATM based on receiving a first verification signal;
   verifying whether the user input matches the second PIN;
   authenticating the user in response to verifying the second PIN by accessing the memory;
   determining that the user is under duress based on verifying authenticity of the second PIN and allowing completion of the card transaction via the ATM based on receiving a second verification signal,
   wherein, when it is verified that the user input matches the second PIN, the method further comprising:
      transmitting a security code to a mobile device carried by the user;
      causing, upon receiving the security code, an application module running on the mobile device to automatically send a push notification regarding current location information of the user to a security module operated by a local authority; and
      maintaining a constant communication between the application module and the security module by sending the push notification continuously from the application module to the security module on predetermined time delta intervals until a confirmation signal of safety of the user is received by the security module,
   wherein, a sub-section within an account section of the application module is provided with a hidden slider that only appears in a screen of the mobile device once the ATM user enters the second PIN and the ATM user's mobile device has received a custom security event from the security module,
   wherein the slider allows the ATM user, in an event when the ATM user accidentally enters the second PIN instead of the first PIN when not under duress, to deactivate a distress signal sent to the security module of the local authority,
   wherein the slider to remains hidden until the distress signal is received from the security module and there being no general notifications on the mobile device about the distress signal is to not alert a bad actor of any suspicious activity, as it is up to the ATM user to manually deactivate the distress signal if she/he is actually safe; and
   terminating the communication between the application module and the security module when the confirmation signal regarding the user's safety is confirmed by the application module or the security module.

2. The method according to claim 1, wherein the push notification includes user's current location data that changes based the user's location while under duress.

3. A system for implementing a multi-tier intercommunication module, comprising:
   a memory that stores a first personal identification number (PIN) and a second PIN different from the first PIN associated with a card transaction, wherein the first PIN is a general PIN that is utilized by an automatic teller machine (ATM) user to conduct a normal card transaction when the user is not under duress to complete the card transaction, wherein the second PIN is an emergency PIN which the ATM user utilizes when the user is under duress to complete the card transaction, and wherein each of the first PIN and the second PIN individually allows completing the card transaction; and
   a processor operatively connected with the memory via a communication network, wherein the processor is configured to:
   receive a user input onto the ATM;
   verify whether the user input matches the first PIN;
   authenticate the user in response to verifying the first PIN by accessing the memory;
   determine that the user is not under duress based on verifying authenticity of the first PIN and allow completion of the card transaction via the ATM based on receiving a first verification signal; and
   verify whether the user input matches the second PIN;
   authenticate the user in response to verifying the second PIN by accessing the memory;
   determine that the user is under duress based on verifying authenticity of the second PIN and allow completion of the card transaction via the ATM based on receiving a second verification signal,
   wherein, when the processor verifies that the user input matches the second PIN, the processor is further configured to:
      transmit a security code to a mobile device carried by the user;
      cause, upon receiving the security code, an application module running on the mobile device to automatically send a push notification regarding current location information of the user to a security module operated by a local authority; and
      maintain a constant communication between the application module and the security module by sending the push notification continuously from the application module to the security module on predetermined time delta intervals until a confirmation signal of safety of the user is received by the security module,
   wherein, a sub-section within an account section of the application module is provided with a hidden slider that only appears in a screen of the mobile device once the ATM user enters the second PIN and the ATM user's mobile device has received a custom security event from the security module,
   wherein the slider allows the ATM user, in an event when the ATM user accidentally enters the second PIN instead of the first PIN when not under duress, to deactivate a distress signal sent to the security module of the local authority, wherein the slider to remains hidden until the distress signal is received from the security module and there being no general notifications on the mobile device about the distress signal is to not alert a bad actor of any suspicious activity, as it is up to the ATM user to manually deactivate the distress signal if she/he is actually safe; and the processor is further configured to:

terminate the communication between the application module and the security module when the confirmation signal regarding the user's safety is confirmed by the application module or the security module.

4. The system according to claim 3, wherein the push notification includes user's current location data that changes based the user's location while under duress.

5. A non-transitory computer readable medium configured to store instructions for implementing a multi-tier intercommunication module, the instructions, when executed, cause a processor to perform the following:

storing, on to a memory, a first personal identification number (PIN) and a second PIN different from the first PIN associated with a card transaction, wherein the first PIN is a general PIN that is utilized by an automatic teller machine (ATM) user to conduct a normal card transaction when the user is not under duress to complete the card transaction, wherein the second PIN is an emergency PIN which the ATM user utilizes when the user is under duress to complete the card transaction, and wherein each of the first PIN and the second PIN individually allows completing the card transaction;

receiving a user input onto the ATM;

verifying whether the user input matches the first PIN;

authenticating the user in response to verifying the first PIN by accessing the memory;

determining that the user is not under duress based on verifying authenticity of the first PIN and allowing completion of the card transaction via the ATM based on receiving a first verification signal;

verifying whether the user input matches the second PIN;

authenticating the user in response to verifying the second PIN by accessing the memory;

determining that the user is under duress based on verifying authenticity of the second PIN and allowing completion of the card transaction via the ATM based on receiving a second verification signal, wherein, when it is verified that the user input matches the second PIN, the instructions, when executed, further cause the processor to perform the following:

transmitting a security code to a mobile device carried by the user;

causing, upon receiving the security code, an application module running on the mobile device to automatically send a push notification regarding current location information of the user to a security module operated by a local authority; and maintaining a constant communication between the application module and the security module by sending the push notification continuously from the application module to the security module on predetermined time delta intervals until a confirmation signal of safety of the user is received by the security module, wherein, a sub-section within an account section of the application module is provided with a hidden slider that only appears in a screen of the mobile device once the ATM user enters the second PIN and the ATM user's mobile device has received a custom security event from the security module, wherein the slider allows the ATM user, in an event when the ATM user accidentally enters the second PIN instead of the first PIN when not under duress, to deactivate a distress signal sent to the security module of the local authority, wherein the slider to remains hidden until the distress signal is received from the security module and there being no general notifications on the mobile device about the distress signal is to not alert a bad actor of any suspicious activity, as it is up to the ATM user to manually deactivate the distress signal if she/he is actually safe; and the instructions, when executed, further cause the processor to perform the following:

terminating the communication between the application module and the security module when the confirmation signal regarding the user's safety is confirmed by the application module or the security module.

* * * * *